3,573,061
SEEDCOAT FLOUR AND METHOD OF MAKING AND USING THE SAME
Elmer F. Glabe, Chicago, and Kazimir K. Lilien, Elmhurst, Ill., assignors to National Bakers Services, Inc., Hollywood, Fla.
No Drawing. Filed Mar. 1, 1968, Ser. No. 709,806
Int. Cl. A21d *13/04, 13/06;* A23l *1/20*
U.S. Cl. 99—90                                  16 Claims

ABSTRACT OF THE DISCLOSURE

An improved seedcoat flour showing reduced water absorption and improved flavor is prepared by intimately mixing seedcoats with an acid preferably 1 N to 5 N HCl, washing the seedcoats, neutralizing the excess acid, drying the seedcoats and heating them to about 325–425° F. The product is then ground into a flour. This flour may be utilized, preferably in combination with wheat flour, to manufacture a low-calorie, yeast-leavened bread. In order to obtain an acceptable bread, egg yolk or hydroxylated lecithin, and preferably a combination of the two is added to the formulation.

---

The present invention relates to an improved seedcoat flour and to methods for making and using the same.

The best way to substantially reduce the calorie content per unit weight of bread is to replace a substantial portion of the wheat flour, which contains 86% digestible carbohydrates, with a flour of lower digestible carbohydrate content, such as seedcoat flour. Many attempts have been made to prepare a suitable flour from various cereal and oil-seedcoats. Unfortunately, no method has heretofore been found for preparing such a flour or for making a suitable yeast-leavened bread therefrom. A primary difficulty has been the high water absorbency of simple ground seedcoat flours, along with undesirable flavors. Thus, while yeast-leavened bread has been prepared using small quantities of seedcoat flour (part of the flour in whole wheat bread, for example, contains the entire wheat grain including the seed coat), attempts to incorporate large amounts of seedcoat flour have produced breads of excessively high density (low specific volume) together with unsatisfactory flavor, shape, odor, grain, and texture.

Generally the present invention relates to a method for preparing a modified seedcoat flour comprising the steps of intimately mixing seedcoats from cereal or legume sources with an acid, washing the seedcoats and neutralizing any residual acid, and drying and heating the seedcoats these steps being performed under the conditions sufficient to substantially reduce the water absorbency of the seedcoats. Subsequent to the heat treatment, the seedcoats are ground into a flour. The resulting flour is characterized by relatively low water absorbency and freedom from undesirable flavor. The present invention also relates to a method for preparing a yeast-leavened bread utilizing the aforementioned seedcoat flour.

More specifically, the seedcoat flour of the present invention may be prepared from numerous oil-seed and cereal sources such as wheat, corn, soybeans, cottonseeds, and sesame seeds. The soybean seedcoats are preferred, however, because of their ready availability and high fiber, or non-digestible carbohydrate, content.

In treating the seed coats, they are first immersed in an acid and intimately mixed therewith. The acid should preferably have a concentration of about 1 to 5 normal. The particular acid utilized is not critical, and hydrochloric, phosphoric, acetic, citric, and tartaric acids have all been found suitable. Hydrochloric acid is preferred.

It is important that the acid treatment be carried out at the proper temperature and for the proper length of time in order to obtain a finished bread product of suitably low density. At room temperature (70° F.), soy bran must be soaked for about 48 hours in approximately 5 normal hydrochloric acid in order to ultimately achieve a bread product of sufficiently low density. It has been found, however, that by heating the acid the time required for treatment can be substantially reduced while using acid of a lower concentration. At higher temperatures, there is also an improvement in the flavor of the finished flour and in the characteristics of a bread prepared therefrom. A five-minute treatment in one normal hydrochloric acid at 212° F. has been found to produce a bread product superior to that achieved with the five normal acid at 70° F. for 48 hours. Of course, combinations of time, temperature and acid concentration between these extremes may also be utilized with success.

Subsequent to the acid treatment step, the seedcoats are thoroughly washed, and the acid is neutralized with a suitable base such as a dilute solution of sodium bicarbonate. The seedcoats are then dried, most easily by mechanically pressing them to remove excess moisture followed by drying in a conventional tray dryer at about 100–200° F. Of course, the particular drying time is dependent upon the equipment and techniques used.

Subsequent to the drying, the seedcoats are heated in an oven preferably at temperatures of about 325° to 425° F. for about 5 to 60 minutes. Finally, the seedcoats are removed from the oven, cooled, and ground into flour. A suitable particle size for the flour is one that will pass a 60 mesh screen.

The flour prepared according to the above-described process may be incorporated into a yeast-leavened bread formulation. While an acceptable bread may be prepared with the seedcoat flour as the only flour in the bread, it is preferred that the seedcoat flour be utilized in combination with wheat flour. The specific volume (volume per unit weight) of the bread product is affected by both the ratio of seedcoat flour to wheat flour as well as the conditions under which the seedcoat flour is treated and the source of the seedcoat flour. For a high specific volume bread similar to white bread, the specific volume should be at least about 4.5 cc./g., and preferably at least 4.8 cc./g. For a moderate specific volume bread more similar to rye or pumpernickel, the specific volume may be much lower, generally around 2.5–4.8 cc./g. Thus, a commercially acceptable bread may be prepared having a wide range of specific volumes. In combination with wheat flour, excellent breads in the high specific volume range have been prepared with a soybean seedcoat flour at levels as high as 45 percent, based on the wheat flour. While there is, of course, no lower limit on the proportion of seedcoat flour, below about 25 percent no substantial decrease is realized in the calorie content of the bread.

If the modified seedcoat flour is simply incorporated directly into the bread formulation, the baked loaf will still be relatively dense, although the density will not be nearly as great as it would be if the seedcoats were not treated as previously described. However, the specific volume may be further substantially increased by including a suitable emulsifier. In order to achieve a product of high specific volume (at least about 4.5 cc./g.) at higher levels of seedcoat flour content, such an emulsifier is essential. The emulsifiers that have produced the outstanding breads in accordance with the present invention are fresh or dried egg yolk and hydroxylated lecithin. While either emulsifier will increase loaf volume by itself, in combination these two components appear to exert a synergistic effect, increasing the specific volume to levels that cannot be achieved with either component alone.

The hydroxylated lecithin employed in the present invention is well known in the art, and is described in U.S. Pat. No. 2,666,704, issued Jan. 19, 1954. This compound is derived from the hydroxylation of commercial lecithin, which is a mixture of phosphatides, primarily lecithin and cephalin, derived from various sources. The ratio of phosphatides will vary somewhat according to the source, but this has no appreciable effect on the present invention.

When egg yolk and hydroxylated lecithin are used in combination, the ratio of egg yolk to hydroxylated lecithin should preferably be about 1.9:1 to about 12.4:1, based on dried egg yolk. Based on the seedcoat flour, at least about 10% egg yolk (dry basis) plus at least about 1.6% hydroxylated lecithin are required for satisfactory high specific volume bread containing seedcoat flour at levels of 25 percent and above, based on the wheat flour.

The upper limits for the egg yolk and hydroxylated lecithin are dictated primarily by economics. That is, above about 20 percent egg yolk (dry basis) and 5.4 percent hydroxylated lecithin, based on the seedcoat flour, little advantage is realized. The precise amounts of egg yolk and hydroxylated lecithin needed for a satisfactory bread depend upon the proportion of seedcoat flour in the overall formulation. Higher seedcoat flour percentages require higher levels of egg yolk and hydroxylated lecithin, based on the seedcoat flour. At higher levels of seedcoat flour, both must be used in combination if a product of high specific volume is desired.

The following examples are intended to illustrate the present invention, and should not be construed as limitative, the scope of the invention being determined by the appended claims.

EXAMPLE 1

One thousand grams of soybean seedcoats were mixed with 7 liters of 5 normal hydrochloric acid in a stainless steel container. The mixture was allowed to stand for 48 hours at room temperature. The acid solution was then poured off, and the seedcoats washed in running tap water until all of the acid was removed. A 15 percent solution of sodium bicarbonate was poured onto the seedcoats and thoroughly mixed with them. This mixture was then poured off and the seedcoats rinsed with tap water until the washings were neutral to litmus paper. The seedcoats were then mechanically pressed to remove excess moisture and spread on stainless steel trays. Drying was carried out at 120° F. for 16 hours.

The dried seedcoats were heated in an oven at 350° F. for 50 minutes, and were then removed, cooled, and were ground in a hammer mill to pass a 60 mesh screen. The flour had a pH of 5.5.

EXAMPLE 2

Example 1 was repeated except that the soy seedcoats were treated in 2.5 normal hydrochloric acid at 212° F. for 15 minutes. The flour had a pH of 6.8.

EXAMPLE 3

Example 1 was repeated except that the soy seedcoats were treated with 1.0 normal hydrochloric acid at 212° F. for 15 minutes. The product had a pH of 5.6.

EXAMPLE 4

Example 1 was repeated except that the soy seedcoats were treated with 2.5 normal hydrochloric acid at 212° F. for 5 minutes. The product had a pH of 6.0.

EXAMPLE 5

Example 1 was repeated except that the soy seedcoats were treated with 1.0 normal hydrochloric acid at 212° F. for 5 minutes. The product had a pH of 6.0.

EXAMPLE 6

Modified soybean seedcoat flours prepared in accordance with Examples 1–5 were incorporated into separate batches of a yeast-leavened, wheat flour-base dough of the following formulation:

SPONGE

|  | Grams |
|---|---|
| Spring wheat flour | 185.00 |
| Wheat gluten (Vital) | 17.50 |
| Yeast food | 1.75 |
| Diastatic malt syrup | 3.00 |
| Yeast | 14.00 |
| Water [1] | 140.00 |
|  | 361.25 |

[1] The amounts of water given here may vary slightly from one example to the next to obtain a dough of the proper consistency, as is well known in the art.

This sponge is mixed 2.5 minutes at 78° F., which is the temperature of the dough when it leaves the mixer. The dough is fermented for 2 hours at 80° F. and 75% relative humidity.

DOUGH STAGE

|  | Grams |
|---|---|
| Sponge (above) | 361.25 |
| Winter wheat flour | 52.50 |
| Wheat gluten | 7.50 |
| Modified soy seedcoat flour | 87.50 |
| Sugar | 21.00 |
| Flavoring and coloring materials (optional) | 16.00 |
| Sodium chloride | 7.00 |
| Nonfat dry milk | 2.89 |
| Hydroxylated lecithin | 2.36 |
| Dehydrated egg yolks | 9.00 |
| Water [1] | 90.00 |
|  | 657.00 |

[1] See footnote 1 in above table.

The above dough was mixed for 3 minutes, and came from the mixer at 80–82° F. A 500-gram portion was weighed out.

The weighed portion was immediately machine molded, (no holding period), and placed in a conventional bread baking pan. The pan of dough was held at 100° F. and 85% relative humidity for 55 minutes, and then baked at 425° F. for 30 minutes. The weight of the finished loaf is approximately 432 grams.

Each of the seedcoat flours prepared in Examples 1–5, was employed in the above-described formulation. In addition, a control was prepared, utilizing soybean seedcoat flour that had not been treated other than by simply grinding. The specific loaf volume was measured for each loaf, and each was scored for shape, grain, texture, odor, and taste. The results are shown below in Table I. The numbers in parentheses indicate the maximum possible score in each category.

TABLE I

| Seed coat flour (Example No.) | Specific volume (cc./g.) | Loaf shape (5) | Grain (10) | Texture (15) | Odor (10) | Taste (20) | Total score (60) |
|---|---|---|---|---|---|---|---|
| 1 | 4.46 | 3.0 | 7.0 | 10.0 | 7.5 | 15.0 | 42.5 |
| 2 | 5.34 | 4.5 | 9.0 | 14.0 | 8.5 | 18.5 | 54.5 |
| 3 | 4.22 | 4.0 | 8.0 | 12.0 | 8.0 | 18.0 | 50.0 |
| 4 | 5.32 | 4.5 | 9.0 | 14.0 | 8.5 | 18.5 | 54.5 |
| 5 | 4.98 | 4.5 | 8.5 | 12.5 | 8.0 | 18.0 | 51.5 |
| Control | 3.25 | 1.5 | 8.5 | 8.5 | 5.0 | 12.0 | 35.5 |

As may be seen from the table, the best results were obtained when the seedcoat flour prepared in Examples 2 and 4 was utilized. This bread was outstanding in every characteristic scored, and showed very good specific volume. The bread prepared from the seedcoat flour of Example 5 was almost as good. The seedcoat flour prepared in Example 1 resulted in a bread that was barely acceptable for a high-volume bread, and scored relatively low in the other categories. Clearly, then, it is preferred to acid-treat the seedcoats for a relatively short time at relatively high temperatures and low acid concentrations.

The bread prepared from the seedcoat flour of Example 3 showed a significantly lower specific volume than the other examples, indicating that this specific combination of time, temperature, and hydrochloric acid concentration was less effective in modifying the soybean seedcoats.

As can be seen, all of the products prepared with treated flour are far supreior to that prepared with the untreated seedcoat flour used in the control. There, the specific volume and loaf shape were extremely poor, and the scores were also low in other characteristics.

EXAMPLE 7

Example 6 was repeated utilizing the seedcoat flour of Example 2, except that the egg yolk, hydroxylated lecithin, and nonfat dry milk (a carrier for the hydroxylated lecithin) were omitted. The results are shown below in Table II.

EXAMPLE 8

Example 6 was repeated, utilizing the seedcoat flour of Example 2, except that 50 grams whole egg (liquid) were substituted for the egg yolk, hydroxylated lecithin, and nonfat dry milk. The results are shown below in Table II.

EXAMPLE 9

Example 6 was repeated, utilizing the seedcoat flour of Example 2, except that the hydroxylated lecithin and nonfat dry milk were omitted. The results are shown below in Table II.

EXAMPLE 10

Example 6 was repeated, utilizing the seedcoat flour of Example 2, except that the egg yolk was omitted. The results are shown in Table II.

pended claims all such modifications as fall within the skilled in the art, and it is intended to cover in the appended claims all such modifications as fall within the true spirit and scope of the invention.

We claim:

1. A process for making a modified seedcoat flour comprising: intimately mixing seedcoats from oil-seed or cereal sources with an acid having a concentration of about 1 to 5 normal at temperatures from about 70° F. to about 212° F. and for a time period of about 5 minutes to 48 hours; washing said seedcoats and neutralizing residual acid; drying said seedcoats; heating said seedcoats to about 325° to 425° F. for about 5 to 60 minutes; and grinding said seedcoats into a flour.

2. The process as defined in claim 1 wherein said seedcoats are soybean seedcoats.

3. A process for making a modified soybean seedcoat flour comprising: intimately mixing soybean seedcoats with an acid selected from the group consisting of hydrochloric, phosphoric, acetic, citric, and tartaric acids having a concentration of about 1 to 5 normal at temperatures from about 70° F. to about 212° F. and for a time period of about 5 minutes to 48 hours; washing said seedcoats and neutralizing residual acid; drying said seedcoats; heating said seedcoats to about 325° to 425° F. for about 5 to 60 minutes; and grinding said seedcoats into a flour.

4. A method for preparing an improved, yeast-leavened bread product comprising: preparing a bread dough formulation utilizing wheat flour and a modified seedcoat flour in an amount effective to reduce the calorie content of said bread product, and up to about 45% based on the weight of said wheat flour, said seedcoat flour prepared by intimately mixing seedcoats from oil-seed or cereal sources with an acid having a concentration of about 1 to 5 normal at temperatures from about 70° F. to about 212° F. and for a time period of about 5 minutes to 48 hours; washing said seed coats and neutralizing residual acid, drying said seed coats, heating said seed coats to about 325° to 425° F. for about 5 to 60 minutes, and grinding said seedcoats into a flour; and baking said formulation.

5. The method as defined in claim 4 wherein said modified seedcoat flour is prepared from soybean seedcoats.

6. The method of claim 5 further including the step of incorporating into said formulation an emulsifier selected

TABLE II

| Seed coat flour (Example No.) | Specific volume (cc./g.) | Loaf shape (5) | Grain (10) | Texture (15) | Odor (10) | Taste (20) | Total score (60) |
|---|---|---|---|---|---|---|---|
| 7 | 3.60 | 3.0 | 8.0 | 11.0 | 9.5 | 18.5 | 50.0 |
| 8 | 3.93 | 3.5 | 9.0 | 11.5 | 9.5 | 18.5 | 52.0 |
| 9 | 3.93 | 3.5 | 9.0 | 11.5 | 9.5 | 18.5 | 52.0 |
| 10 | 4.30 | 4.0 | 8.5 | 12.0 | 9.5 | 18.5 | 52.5 |

As can be seen from Table II, the omission of both of the emulsifiers in Example 7 results in a product of substantially reduced specific volume, but scoring high in other characteristics. Such a product would be excellent if a high specific volume were not required.

Similarly, Examples 8 and 9 demonstrate a significant increase in volume by the addition of an egg yolk emulsifier. Again, the specific volume is not high enough to form a product of specific volume similiar to commercial white bread, but is acceptable if this is not desired. A comparison of Examples 8 and 9 shows that liquid and dehydrated egg yolk are equivalent for the purposes of the present invention.

Finally, Example 10 demonstrates a further increase in specific volume by utilizing hydroxylated lecithin in the absence of egg yolk. Again, the specific volume is not as high as commercial white bread, but the product scored high in other characteristics, and is satisfactory where a high specific volume is not required.

Obviously, many modifications and variations of the invention as hereinbefore set forth will occur to those from the group consisting of egg yolk, hydroxylated lecithin, and combinations thereof.

7. A method for preparing an improved, yeast-leavened bread product from wheat flour and seedcoat flour comprising: incorporating a modified seedcoat flour into an unbaked bread dough formulation in an amount effective to reduce the calorie content of said bread product, and up to about 45% based on said wheat flour, said seedcoat flour prepared by intimately mixing seedcoats from oil-seed or cereal sources with an acid having a concentration of about 1 to 5 normal at temperatures from about 70° F. to about 212° F. and for a time period of about 5 minutes to 48 hours, washing said seedcoats and neutralizing residual acid, drying said seed coats, heating said seedcoats to about 325° to 425° F. for about 5 to 60 minutes, and grinding said seedcoats into a flour; further incorporating egg yolk into said formulation; and baking said formulation.

8. The method as defined in claim 7 wherein said modified seedcoat flour is prepared from soybean seedcoats.

9. The method as defined in claim 8 further including the step of incorporating into said formulation hydroxylated lecithin along with said egg yolk, the ratio of egg yolk to hydroxylated lecithin being about 1.9:1 to about 12.4:1, based on dried egg yolk.

10. The method as defined in claim 9 wherein said egg yolk is incorporated into said formulation in an amount of at least about 10%, based on the weight of said seedcoat flour, and said hydroxylated lecithin is incorporated in an amount of at least about 1.6%, based on the weight of said seedcoat flour.

11. A process for making a modified soybean seedcoat flour comprising: intimately mixing soybean seedcoats with hydrochloric acid having a concentration of about 1 to 5 normal at temperatures from about 70° F. to about 212° F. and for a time period of about 5 minutes to 48 hours; washing said seedcoats and neutralizing residual acid; drying said seedcoats; heating said seedcoats to about 325° to 425° F. for about 5 to 60 minutes; and grinding said seedcoats into a flour.

12. A flour derived from seedcoats and characterized by relatively low water absorbency and freedom from undesirable flavor prepared according to the method comprising: intimately mixing seedcoats from oil-seed or ceral sources with an acid having a concentration of about 1 to 5 normal at temperatures from about 70° F. to about 212° F. and for a time period of about 5 minutes to 48 hours; washing said seedcoats and neutralizing residual acid; drying said seedcoats; heating said seedcoats to about 325° to 425° F. for about 5 to 60 minutes; and grinding said seedcoats into a flour.

13. The flour as defined in claim 12 wherein said seedcoats are soybean seedcoats.

14. The flour as defined in claim 13 wherein said acid is hydrochloric acid.

15. An improved yeast-leavened bread comprising: wheat flour and seedcoat flour, said seedcoat flour being present at levels of about 25 to 45 percent based on the weight of said wheat flour, and said seedcoat flour being prepared according to the method comprising: intimately mixing seedcoats from oil-seed or cereal sources with hydrochloric acid having a concentration of about 1 to 5 normal at temperatures from about 70° F. to about 212° F. and for a time period of about 5 minutes to 48 hours; washing said seedcoats and neutralizing residual acid; drying said seedcoats; heating said seedcoats to about 325° to 425° F. for about 5 to 60 minutes; and grinding said seedcoats into a flour.

16. The bread of claim 15 wherein said seedcoats are soybean seedcoats.

References Cited
UNITED STATES PATENTS

| | | | |
|---|---|---|---|
| 966,324 | 8/1910 | Finkler | 99—93 |
| 972,103 | 9/1910 | Finkler | 99—93 |
| 1,751,267 | 3/1930 | Darling | 99—93 |

RAYMOND N. JONES, Primary Examiner

J. R. HOFFMAN, Assistant Examiner

U.S. Cl. X.R.

99—93, 99

PO-1050
(5/69)

UNITED STATES PATENT OFFICE
CERTIFICATE OF CORRECTION

Patent No. 3,573,061  Dated March 30, 1971

Inventor(s) Elmer F. Glabe et al

It is certified that error appears in the above-identified patent and that said Letters Patent are hereby corrected as shown below:

Column 5, line 18, "supreior" should be --superior--.

Column 5, line 44, after "shown" insert --below--.

Column 5, line 75, after "those" insert --skilled in the art and it is intended to cover in the ap--.

Column 6, delete line 2.

Column 7, line 25, "ceral" should be --cereal--.

Signed and sealed this 24th day of August 1971.

(SEAL)
Attest:

EDWARD M. FLETCHER, JR.
Attesting Officer

WILLIAM E. SCHUYLER, JR.
Commissioner of Patents